(12) United States Patent
White et al.

(10) Patent No.: US 11,307,764 B2
(45) Date of Patent: Apr. 19, 2022

(54) CONTEXTUALLY INFERRED TALKING POINTS FOR IMPROVED COMMUNICATION

(71) Applicant: Microsoft Technology Licensing, LLC, Redmond, WA (US)

(72) Inventors: Ryen William White, Woodinville, WA (US); Nikrouz Ghotbi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 15/670,787

(22) Filed: Aug. 7, 2017

(65) Prior Publication Data

US 2019/0042086 A1  Feb. 7, 2019

(51) Int. Cl.
| | | |
|---|---|---|
| *G06F 3/0489* | (2013.01) | |
| *G06F 3/04895* | (2022.01) | |
| *G06Q 10/10* | (2012.01) | |
| *G06Q 50/00* | (2012.01) | |
| *G06Q 30/00* | (2012.01) | |
| *G06Q 10/00* | (2012.01) | |
| *G06F 15/16* | (2006.01) | |

(52) U.S. Cl.
CPC ......... *G06F 3/04895* (2013.01); *G06Q 10/00* (2013.01); *G06Q 10/10* (2013.01); *G06Q 10/109* (2013.01); *G06Q 30/016* (2013.01); *G06Q 50/01* (2013.01); *G06F 15/16* (2013.01)

(58) Field of Classification Search
CPC ..... G06F 3/04895; G06F 15/16; G06Q 10/00; G06Q 10/10; G06Q 30/016; G06Q 50/01; G06Q 10/109

USPC .......................................................... 709/204
See application file for complete search history.

(56) References Cited

U.S. PATENT DOCUMENTS

| | | |
|---|---|---|
| 8,020,104 B2 | 9/2011 | Robarts et al. |
| 9,542,503 B2 | 1/2017 | Franceschini et al. |
| 10,860,985 B2 * | 12/2020 | Nelson .................. G06Q 10/10 |
| 2009/0086720 A1 | 4/2009 | Westlake |
| 2012/0265819 A1 | 10/2012 | Mcgann et al. |
| 2013/0287187 A1 | 10/2013 | Gandhe et al. |

(Continued)

OTHER PUBLICATIONS

Bergman, et al., "A Personal Email Assistant", http://www.hpl.hp.com/techreports/2002/HPL-2002-236.pdf, Published on: Aug. 22, 2002, pp. 1-22.

(Continued)

*Primary Examiner* — Chris Parry
*Assistant Examiner* — Weiwei Y Stiltner
(74) *Attorney, Agent, or Firm* — Shook, Hardy & Bacon L.L.P.

(57) ABSTRACT

Generating talking points on behalf of a user and providing the talking points to the user is provided. Talking points can help users to quickly and easily start a personalized conversation that enables participants of the conversation to make a connection, thus eliciting better communication and collaboration. Talking points can be generated based on commitments or requests identified in a previous conversation, anomalies or patterns identified in context data, or information items of interest collected from various data sources. One or more top-ranking talking points are surfaced to the user to help the user start a new conversation or to continue a previous conversation.

20 Claims, 12 Drawing Sheets

(56) References Cited

U.S. PATENT DOCUMENTS

| | | | |
|---|---|---|---|
| 2014/0082100 A1* | 3/2014 | Sammon | G06Q 10/109 709/206 |
| 2014/0229471 A1* | 8/2014 | Galvin | G06F 17/3053 707/725 |
| 2014/0289231 A1* | 9/2014 | Palmert | G06F 17/277 707/723 |
| 2015/0149237 A1 | 5/2015 | Brock | |
| 2015/0156268 A1* | 6/2015 | Lev | H04L 51/32 709/204 |
| 2015/0172462 A1* | 6/2015 | Cudak | H04M 3/4365 455/413 |
| 2015/0207765 A1* | 7/2015 | Brantingham | H04L 51/046 715/758 |
| 2015/0261867 A1* | 9/2015 | Singal | G06Q 50/01 707/722 |
| 2016/0092578 A1* | 3/2016 | Ganani | G06F 16/335 707/728 |
| 2016/0127683 A1* | 5/2016 | Hanson | H04N 7/15 348/14.08 |
| 2017/0289808 A1* | 10/2017 | Wang | G06Q 10/109 |
| 2018/0322380 A1* | 11/2018 | Aggarwal | G06N 3/006 |
| 2018/0336478 A1* | 11/2018 | Bostick | H04L 67/18 |

OTHER PUBLICATIONS

Jost, et al., "Suggesting New Interactions Related to Events in a Social Network for Elderly", In Proceedings of the Second International Workshop on Design and Implementation of Independent and Assisted Living Technology, Sep. 2012, pp. 1-4.

Hutchinson, Andrew, "LinkedIn Adds 'Conversation Starters' Prompts to Messaging", http://www.socialmediatoday.com/social-networks/linkedin-adds-conversation-starters-prompts-messaging, Published on: Dec. 7, 2016, 4 pages.

Perez, Sarah, "Facebook Messenger suggests what to talk about with "Conversation Topics" feature", https://techcrunch.com/2016/10/17/facebook-messenger-tells-you-what-to-talk-about-with-conversation-topics-feature/, Published on: Oct. 17, 2016, 6 pages.

"International Search Report and Written Opinion Issued in PCT Application No. PCT/US2018/038651", dated Aug. 10, 2018, 12 Pages.

* cited by examiner

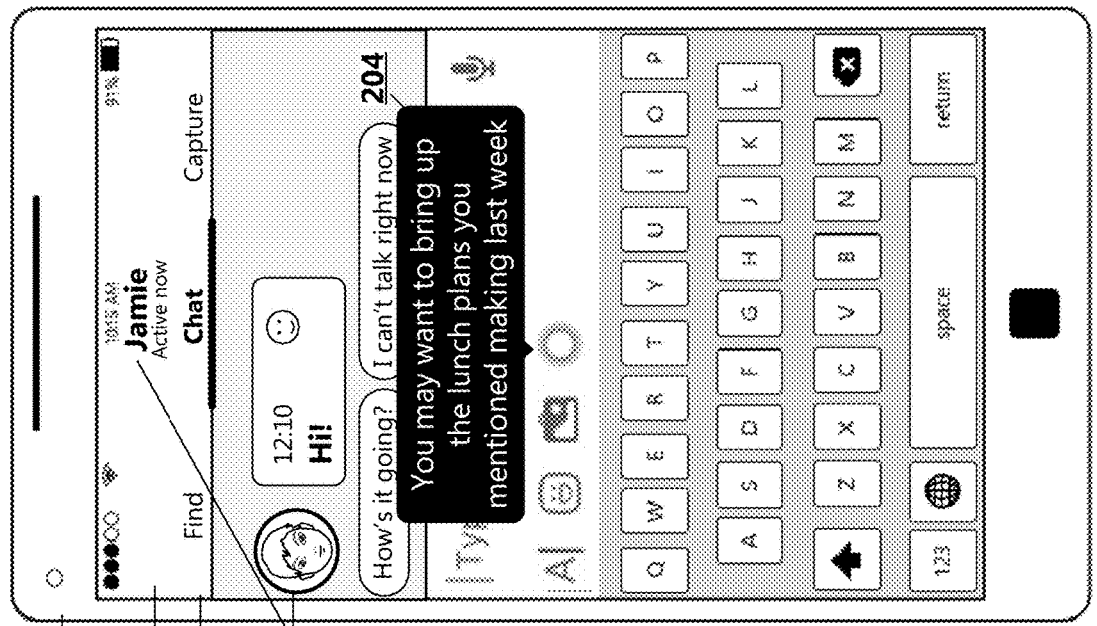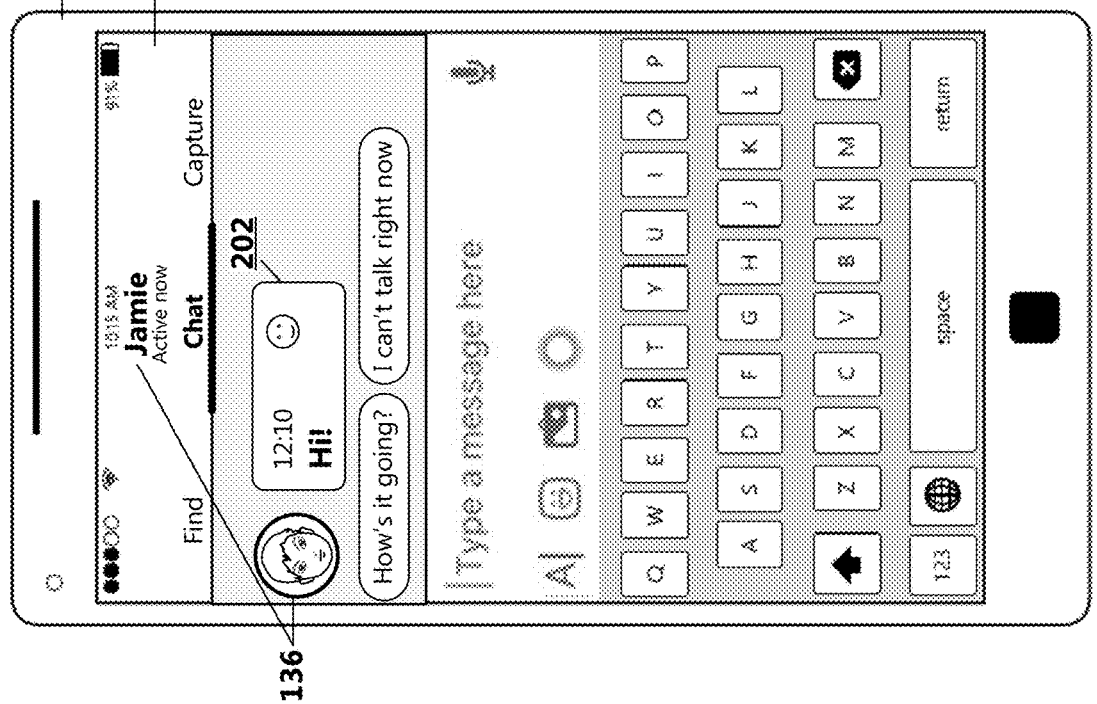

MOBILE COMPUTING DEVICE

CONTEXTUALLY INFERRED TALKING POINTS FOR IMPROVED COMMUNICATION

BACKGROUND

When conversing with another individual, whether via an electronic message, phone call, in a meeting, at a professional appointment, etc., initiating a conversation or remembering information to discuss with the individual can be challenging. For example, a conversation may be a first meeting between a user and an individual, it may have been a while since having a previous conversation with the individual, the user may not be adept at remembering previous conversations or items to discuss with the individual, or the user may be unfamiliar with the individual. Likewise, it can also be difficult to reach out to someone whom the user has not met with or worked with for a while, or someone new to whom the user has been introduced through digital channels, especially when trying to make a personal connection with a goal of continuing the relationship to achieve a common goal together. As can be appreciated, having talking points prepared for a conversation with an individual based on previous conversations with the individual, knowledge of the individual, or knowledge of the subject of the conversation can enable a more efficient or effective conversation and/or enable the participants of the conversation to make a connection, thus eliciting better communication and collaboration.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer readable storage device for generating and providing talking points for a personalized conversation. For example, having talking points for a conversation can help the user to quickly and easily start the personalized conversation that enables the conversation participants to make a better connection, thus eliciting better communication and collaboration. Upon detection of a currently-occurring or upcoming conversation with one or more conversation participants, information items of interest related to the conversation or to the one or more conversation participants are extracted from data collected from one or more data sources. The information items of interest are ranked based on a determined relevance to the user for the conversation, and one or more top-ranking information items of interest are surfaced to the user as one or more talking points for the conversation.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 2A is an illustration of an example user interface display showing an initiation of a conversation according to an aspect;

FIG. 2B is an illustration of an example user interface display showing one example of surfacing a talking point to the user;

DETAILED DESCRIPTION

Figure 1A:
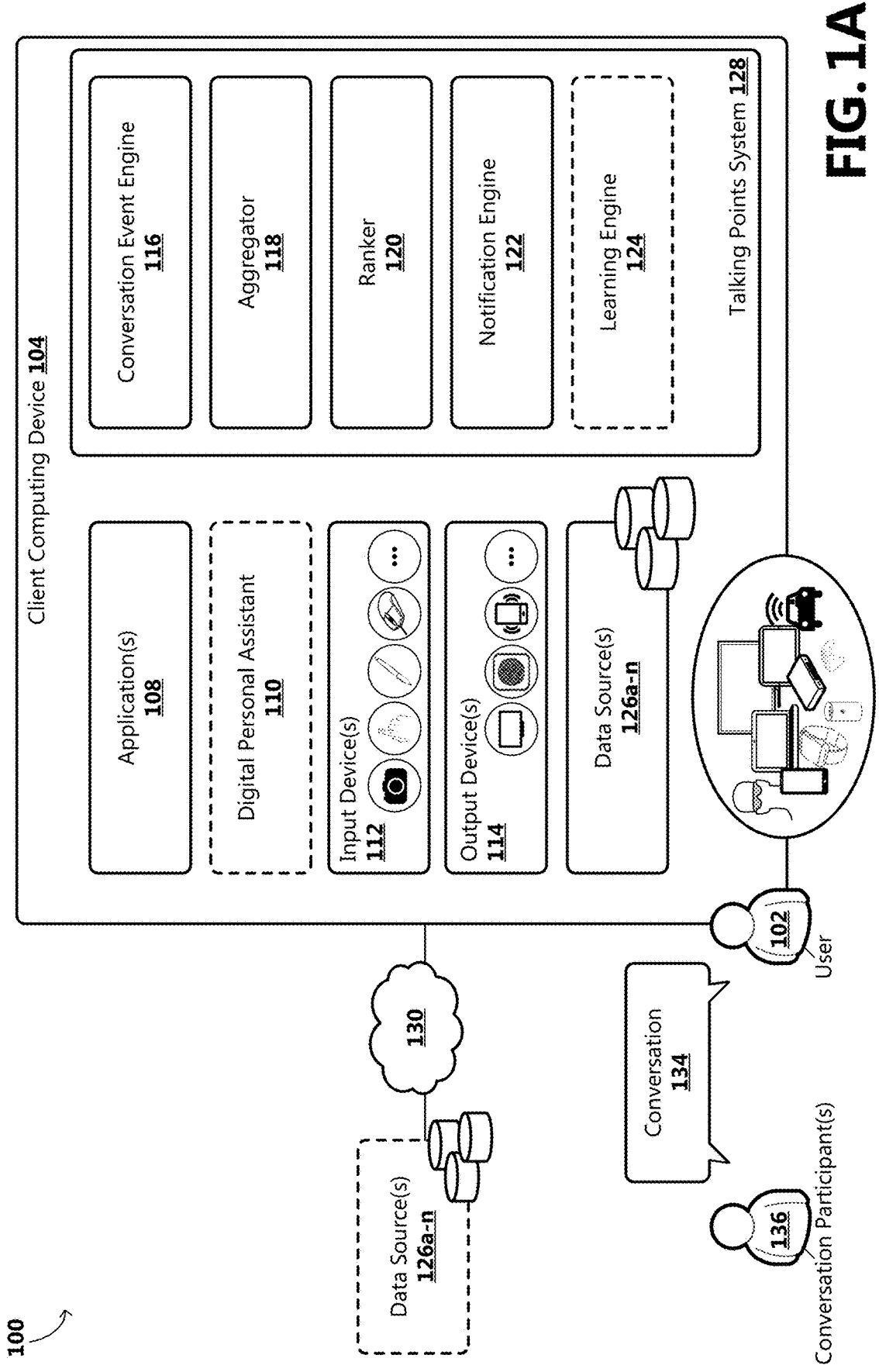
FIG. 1A is a block diagram showing an example operating environment including components of a system for generating and providing talking points for a personalized conversation.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer readable storage device for generating and providing talking points for a personalized conversation. Upon detection of a currently-occurring or upcoming conversation with one or more conversation participants, information items of interest related to the conversation or to the one or more conversation participants are extracted from data collected from one or more data sources. The information items of interest are ranked based on a determined relevance to the user for the conversation, and one or more top-ranking information items of interest are surfaced to the user as one or more talking points for the conversation. Advantageously, providing talking points to a user for a conversation can help the user to quickly and easily start a personalized conversation or to carry on a productive conversation. Accordingly, conversation participants are enabled to make a better connection, thus eliciting better communication, collaboration, and an improved user experience. Further, by providing relevant information to the user for the conversation, the user does not have to search for information, such as past conversation documents for identifying commitments or requests, common information between the user and the conversation participant, or other information related to the conversation or to the conversation participant. Accordingly, the consumption of processing resources and bandwidth can be reduced.

Figure 1B:
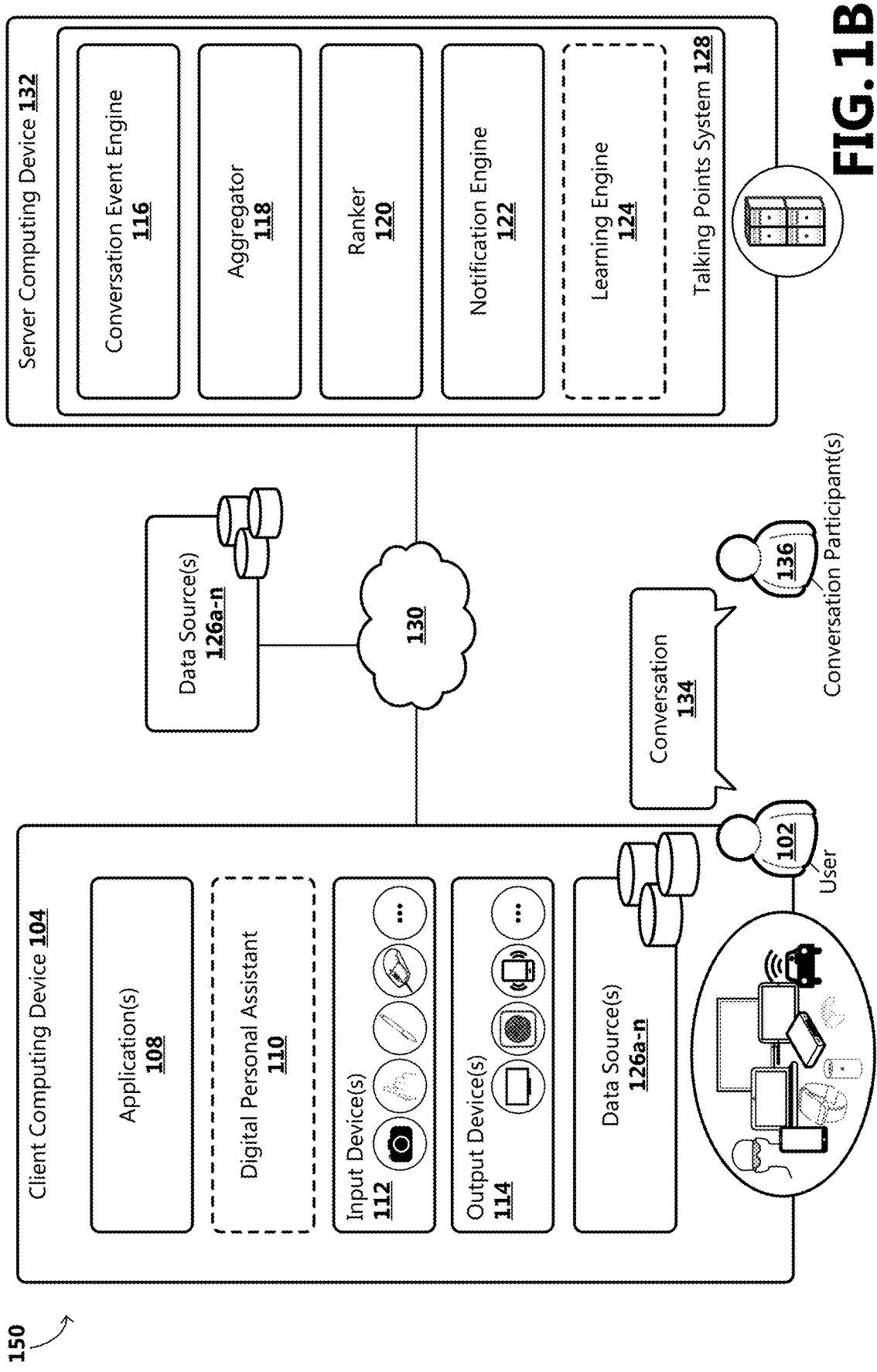
FIG. 1B is a block diagram showing another example operating environment including components of a system for generating and providing talking points for a personalized conversation.

Aspects of the present disclosure are directed to a system, method, and computer readable storage device for generating and providing talking points for a personalized conversation. FIGS. 1A and 1B illustrate example computing environments 100,150 in which a talking points system 128 can be implemented for generating and providing talking points for a personalized conversation, for example, to help a user to quickly and easily start a personalized conversation that enables the participants to make a connection, thus eliciting better communication and collaboration, according to various aspects. In some examples and as shown in FIG. 1A, the talking points system 128 is implemented on a client computing device 104. The client computing device 104 can be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, an "Internet of Things" (IoT) device, or other type of computing device) for implementing the talking points system 128 for generating and providing talking points for a personalized conversation. In other examples, the talking points system 128 is implemented on one or a plurality of server computing devices 132, as illustrated in FIG. 1B. The one or more server computing devices 132 are configured or operative to provide data to and receive data from the client computing device 104 through a network 130 or a plurality of networks. In some examples, the network 130 is a distributed computing network, such as the Internet. In some examples, the talking points system 128 is a hybrid system that includes the client computing device 104 as illustrated in FIG. 1A in conjunction with the server computing device 132 as illustrated in FIG. 1B. In some examples, the talking points system 128 is exposed to the client computing device 104 as an API. The hardware of these computing devices 104,132 is discussed in greater detail in regard to FIGS. 8, 9A, 9B, and 10.

According to an aspect, the client computing device 104 includes or is communicatively attached to one or more applications 108. A user 102 can use an application 108 on the computing device 104 for a variety of tasks, which can include, for example, to write, calculate, draw, take and organize notes, search for and receive information, organize and prepare presentations, organize information, send and receive electronic mail, make music, and the like. Examples of suitable applications 108 include, but are not limited to, word processing applications, spreadsheet applications, slide presentation applications, electronic mail applications, electronic calendaring applications, messaging applications, drawing applications, note-taking applications, web browser applications, and game applications. Other applications are possible and are within the scope of the present disclosure. Applications 108 can include thick client applications, which are stored locally on the computing device 104, or can include thin client applications (i.e., web applications) that reside on a remote server computing device 132 and accessible over a network 130. A thin client application can be hosted in a browser-controlled environment or coded in a browser-supported language and reliant on a common web browser to render the application 108 executable on the client computing device 104.

In some examples, the client computing device 104 includes a digital personal assistant 110. Digital personal assistant functionality can be provided as or by a stand-alone application, part of an application 108, or part of an operating system of the client computing device 104. According to an aspect, the digital personal assistant 110 employs a natural language user interface (UI) that can receive spoken utterances (e.g., voice control, commands, queries, prompts) from a user 102 that are processed with voice or speech recognition technology. A digital personal assistant 110 can support various functions, which can include interacting with the user 102 (e.g., through the natural language UI and other graphical UIs); performing tasks (e.g., making note of appointments in the user's calendar, sending messages and emails); providing services (e.g., answering questions from the user, mapping directions to a destination); gathering information (e.g., finding information requested by the user about a book or movie, locating the nearest Italian restaurant); operating the client computing device 104 (e.g., setting preferences, adjusting screen brightness, turning wireless connections on and off); and various other functions. The functions listed above are not intended to be exhaustive and other functions may be provided by the digital personal assistant 110.

According to aspects, the client computing device 104 includes a user interface system, which can include input/output (I/O) devices and components that enable communication between the user 102 and the computing device. For example, the user interface system can include one or more input devices 112, such as mouse pointer used to interact with a graphical user interface (GUI) displayed by display screen, a keyboard, a motion sensor, a gesture sensor, a microphone for voice input, a touchscreen, a camera for image input, etc. For example, the client computing device 104 can receive input from the user 102, such as text input, drawing input, inking input, selection input, etc., via various input methods, such as those relying on mice, keyboards, and remote controls, as well as Natural User Interface (NUI) methods, which enable the user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user interface system can also include one or more output devices 114, such as display screen(s), speakers, haptic devices for tactile feedback, and other types of output devices. In certain cases, an input device 112 and an output device 114 can be combined in a single device, such as a touchscreen display which both depicts images and receives touch gesture input from the user.

With reference still to FIGS. 1A and 1B, the talking points system 128 is configured or operative to receive an indication of a current conversation 134 or an upcoming conversation 134 between the user 102 and another conversation participant 136, extract items of interest associated with the other conversation participant 136 from one or more data sources 126*a-n* (collectively 126), rank the extracted items of interest based at least in part on context information, and present top ranking items of interest as talking points to the user 102 for the current or upcoming conversation 134 with the other conversation participant 136. According to an aspect, the talking points system 128 includes a conversation event engine 116 illustrative of a software module, system, or device that is configured or operative to detect a trigger associated with a current or a future (upcoming) conversation 134 between the user 102 and another conversation participant 136. Examples of conversations 134 between the user 102 and another conversation participant 136 can include various types of interactions with one or more participants, such as in-person meetings or appointments, electronic conversations via email messages, instant messages, social media messages, or other types of electronic message, voice-only conversations, video conversations, and the like. The conversation participant 136 can include one or more individuals, such as a friend, a colleague, a professional (e.g., physician, attorney, accountant, wedding/event planner, professor), or other person whom the user 102 is currently involved in a conversation 134 with or starting a conversation 134 with, or, based on knowledge of the user's schedule, a person with whom the user is planning to have a conversation 134.

In some examples, the trigger associated with a conversation 134 between the user 102 and another conversation participant 136 is an initiation of a conversation, such as the start of a meeting (which can include an ad hoc meeting), the start of an appointment, a selection to compose, respond to, or forward an email message, a selection to compose an instant message, receiving a call from a conversation participant 136, dialing a phone number or selection of a contact for initiation of a phone call, receiving an email message, and the like. For example, in an ad hoc setting or encounter between the user 102 and another conversation participant 136, the trigger event is the initiation of the conversation 134 between the two parties. Consider, for example, in a cold calling setting where the conversation participant 136 calls the user 102, a trigger event can be when the user's phone receives the call (e.g., starts ringing). In other examples, the trigger associated with a conversation 134 between the user 102 and another conversation participant 136 is a reminder of a meeting or appointment (e.g., m minutes in advance of the starting time of a meeting). In other examples, the trigger associated with a conversation 134 between the user 102 and another conversation participant 136 is a detection of a meeting or appointment in the user's calendar within a next n hours or days.

In other examples, the trigger includes a detection of context information. For example, the conversation event engine 116 detects a current conversation 134 or an initiation of a conversation 134 based at least in part on context information, such as a detection of the user's location (e.g., determining that the user is meeting with a particular individual based on detection of the user's location at a location associated with the particular individual or co-presence of the user and the individual) or a detection of virtual co-presence of the user 102 and a conversation participant 136 (e.g., on social media, in a chat session or chat room). In some examples, the conversation event engine 116 detects upcoming conversations 134, for example, based on knowledge of the user's schedule (e.g., detection of an event scheduled on the user's calendar). In other examples, the trigger event is a request from the user 102 for one or more talking points. For example, the user 102 is enabled to explicitly ask for talking points for a particular individual or for a particular conversation 134.

According to an aspect, the conversation event engine 116 is further configured or operative to extract information associated with a detected conversation 134, for example, to identify or determine the person with whom the user 102 is having or will be having the conversation 134 (i.e., the conversation participant 136). In some examples, the conversation event engine 116 may extract information, such as aliases, email addresses, phone numbers, or addresses associated with the other conversation participant(s) 136. Based on data available via one or more data sources 126 (e.g., the user's stored contacts, information from social networks, information from the user's enterprise, web information, historical conversation information), the conversation event engine 116 is configured or operative to determine or infer who the conversation participant(s) 136 are. In some examples, the conversation event engine 116 is further configured or operative to collect context information associated with the conversation 134, such as the type of computing device 104 (e.g., mobile device, wearable device, desktop device) that is being used or is likely to be used for the conversation 134 or that the user 102 has or will likely have before or during the conversation, device capabilities, a type of application 108 used or likely to be used for the conversation 134, the user's location, information about a location associated with the conversation, other entities associated with the conversation, temporal data (e.g., time of day, day of the week, month of the year, conversation duration, the user's activity (e.g., traveling, walking, waiting, exercising), other applications being used by the user concurrent to the conversation, the user's activity preceding the conversation, whether the user's client computing device 104 is paired with another device (e.g., a speaker, a display, a wearable device), etc. In some examples, context information includes data that are sensed or otherwise detected by a sensor (or other detector) component integrated in or communicatively attached to the client computing device 104.

According to an aspect, the talking points system 128 further includes an aggregator 118 illustrative of a software module, system, or device that is configured or operative to aggregate data from one or more data sources 126, such as data associated with the user 102, the user's communication patterns, the conversation participant(s) 136, the conversation 134, past conversations, the relationship between the user and the conversation participant(s), and the like, for identifying and extracting one or more items of interest that can be selected as talking points for the conversation. In some examples, data are aggregated from one or more web sources, social networks, one or more sources of user data, or from the user's enterprise. In some examples, one or more data sources 126 can include sources including information about the user's behaviors (in which such behaviors are monitored/tracked with notice to the user and with the user's consent), a record or history of the user's communications with contacts, mutual interests, past conversation topics, past promises or requests, past or current projects, updates (e.g., job changes, organizational changes, new projects), etc.

In some examples, the talking points system 128 is in communication with a knowledge graph, illustrative of a repository of entities and relationships between entities. For example, components of the talking points system 128 can query the knowledge graph for properties associated with the user 102 and/or with the identified other conversation participant(s). In a graph knowledgebase, entities are represented as nodes, and attributes and relationships between entities are represented as edges connecting the nodes. Thus, the graph knowledgebase provides a structured schematic of entities and their relationships to other entities. According to examples, edges between nodes can represent an inferred relationship or an explicit relationship. According to an aspect, the graph knowledgebase is continually updated with content mined from a plurality of data sources 126 (e.g., web pages, social networks, enterprise data, or other networked data stores).

Further, one or more data sources 126 can include user data, such as user history, application usage, online activity, browsing history, searches, voice data such as automatic speech recognition, activity logs, physiological data collected from a wearable device or other sensor-enabled device, communications data including calls, texts, instant messages, emails, transcripts, website posts, meetings, and other user data associated with communication events, contacts data, calendar and schedule data, notification data, social-network data, news (including popular or trending items on search engines or social networks), online gaming data, e-commerce activity, and user-account(s) data (which can include data from user preferences or settings associated with the talking points system 128, an application 108, a digital personal assistant 110, or service). In some examples, user data include information associated with user interactions that occur over more than one computing device.

According to an aspect, based on information collected from one or more data sources 126, the talking points system 128 is enabled to identify various items of interest associated with the user 102, items of interest associated with the other conversation participant(s) 136, and/or items of interest associated with past conversations 134 between the user 102 and the other conversation participant(s) 136. In some examples, items of interest can include commitments, task items, action items, topics, projects, or insights of interest (e.g., business-related, personal), physiological information, detected activities or behaviors, etc.

According to an aspect, the talking points system 128 further includes a ranker 120 illustrative of a software module, system, or device that is configured or operative to rank items of interest associated with the user 102, items of interest associated with the other conversation participant(s) 136, and/or items of interest associated with past conversations 134 between the user 102 and the other conversation participant(s) 136. For example, the ranker 120 is configured or operative to rank an information item of interest based on its relevance to a particular conversation 134 or conversation participant 136. In some examples, the ranker 120 uses semantic analysis to determine a topic or category associated with an information item of interest (e.g., a task related to a specific project, a personal-related factoid, a health-related observation, a health-related search query, a family-related fact). A topic or category can be used by the ranker 120 to rank relevance of an information item of interest to a particular conversation 134 or conversation participant 136. That is, in some examples, a level of relevance of a particular information item of interest to a current or upcoming conversation 134 can be determined based at least in part on the subject or topic of the conversation 134 (e.g., the subject of a meeting, the subject of an email, an inferred topic of a conversation 134).

In other examples, a level of relevance of a particular information item of interest to a current or upcoming conversation 134 can be determined based at least in part on the conversations participant(s) 136 (e.g., relatedness between the information item of interest and the conversation participant 136, type or nature of the relationship (e.g., business, professional, personal, family) between the user 102 and the conversation participant 136, a level of familiarity between the user 102 and the conversation participant 136, the conversation participant's title).

For example, the ranker 120 can determine that a health-related observation is relevant to a conversation 134 with a healthcare professional, while a work project-related item can be determined as a talking point that is not-relevant to a conversation with the healthcare professional. As another example, the ranker 120 can determine that an action item discussed in a previous conversation 134 between the user 102 and a conversation participant 136 in an email, in a meeting, or via another communication means is relevant to a current or upcoming meeting, wherein the subject of the meeting is related to the previous conversation 134 or discussed action item and wherein the user 102 and the conversation participant 136 are attendees of the current or upcoming meeting. As another example, the ranker 120 can determine that a personal-related factoid, such as that the conversation participant 136 graduated from the same university as the user 102, is not relevant to a current or upcoming conversation 134 between the user 102 and the conversation participant 136 because the user 102 and the conversation participant 136 are already familiar with each other.

According to an aspect, in some examples, a level of relevance of a particular information item of interest to a current or upcoming conversation 134 can be determined based at least in part on the type of computing device 104 or the mode of communication associated with the current or upcoming conversation 134. For example, from an analysis of the user's communications patterns and behaviors, a pattern can be identified that that the user 102 typically discusses business-related information when communicating via email, business-related information and small talk or chit-chat when communicating via instant message (IM), and career-related, personal-related, and business-related information when communicating in meetings (e.g., online meetings, in-person meetings). Accordingly, the ranker 120 can rank the relevance of an information item of interest higher for a particular current or upcoming conversation 134 when the category (e.g., business-related, personal-related, news-related, health-related) of the information item of interest matches the user's patterns of behavior as it relates to the mode of communication (e.g., email, IM, in-person meeting, web-based meeting, phone call) associated with the current or upcoming conversation 134. Further, in some examples, a level of relevance of a particular information item of interest to a current or upcoming conversation 134 can be determined based at least in part on a temporal factor (e.g., older information can be ranked lower than more recent information).

In some examples, the ranker 120 is configured or operative to determine a level of relevance of a particular information item of interest to a current or upcoming conversation 134 based at least in part on whether the information item of interest is determined to be anomalous from historic data. For example, consider that a user 102 has an appointment with his primary care physician that is scheduled on his calendar. Physiological data, other data related to user behavior, as well as health-related search queries performed by the user 102 can be collected (e.g., by various sensors), aggregated (e.g., by the aggregator 118), and ranked (e.g., by the ranker 120) for determining whether one or more pieces of the collected data are relevant to the user's appointment with his physician. For example, physiological data and other user behavior data can include such information as the user's observed sleep schedule, the user's heartrate, the user's exercise or activity schedule, and the like. Consider, for example, that a determination is made that the user's sleep schedule over the past two weeks is anomalous from the user's historic sleep patterns. Accordingly, in response to a detection (at the time of or in advance) of the user's appointment (i.e., conversation 134) with his physician, the ranker 120 is configured or operative to rank the observed anomalous sleep schedule of the user 102 highly, wherein a high ranking corresponds to a high degree of relevance to the user's appointment (i.e., conversation 134) with his physician (i.e., conversation participant 136).

In some examples, the ranker 120 is configured or operative to determine a level of relevance of a particular information item of interest to a current or upcoming conversation 134 based at least in part on whether the information item of interest is determined to be a pattern demonstrating a trend (e.g., sleep quality decreasing over time, resting heart rate increasing, exercise decreasing over time).

Further, the ranker 120 is configured or operative to rank health-related concerns, for example, as expressed through search query data, as relevant information items of interest for a conversation 134. For example, the user's multiple medically-related search queries (e.g., multiple search queries relating to loss of balance) can be determined to be a relevant information item of interest for the user's appointment (i.e., conversation 134).

According to an aspect, the ranker 120 is further configured or operative to select one or more top ranking information items of interest as one or more talking points to provide to the user 102 for the current or upcoming conversation 134. In some examples, the ranker 120 selects a predetermined number of top ranked information items of interest as talking points. In other examples, the ranker 120 selects one or more top ranking information items of interest for one or more particular categories (e.g., a highest ranked observation about the user's activity level, a highest ranked observation about the user's sleeping patterns, a highest ranked medically-related search query). Other selection methods are possible and are within the scope of the present disclosure.

According to an aspect, the user 102 is enabled to manually-enter one or more talking points to be surfaced for a particular conversation 134 or for a conversation with a particular conversation participant 136. For example, the user 102 can enter talking points as the user 102 remembers them, as well as edit a list of talking points that have been automatically identified by the talking points system 128. For example, the user 102 can edit a talking point or delete a talking point, and in response, the talking points system 128 can update the list of talking points. The user 102 in the above example can instruct the digital personal assistant 110 to add the talking point "ask the doctor about numbness in arm" to talking points for the upcoming appointment with Dr. Smith. Accordingly, responsive to detecting a trigger relating to the appointment, the manually-entered talking point can be surfaced to the user 102 with one or more automatically-determined talking points.

In some examples, the user 102 is enabled to input a talking point or a talking point category or subject, which can be used by the talking points system 128 as a starter query for information items of interest related to the user-entered talking point or talking point category. For example, for a particular conversation participant 136, the user 102 can input the talking point category "sports." Accordingly, responsive to detecting a trigger relating to a conversation 134 including the conversation participant 136, information items of interest relating to sports can be aggregated and ranked for inclusion as one or more talking points for the conversation. For example, information about the conversation participant 136 playing minor league baseball after graduating from college may be collected from a social networking data source 126. Based in part because of the user-input talking point category, the collected sports-related information item can be ranked as highly-related to the user's conversation 134, and included as a talking point for the conversation 134.

According to an aspect, the talking points system 128 further comprises a notification engine 122. The notification engine 122 is illustrative of a software module, system, or device that is configured or operative to receive one or more talking points associated with a particular conversation 134 or with a conversation 134 with a particular conversation participant 136 from the ranker 120, and notify the user 102 of the one or more talking points. In some examples, talking points are surfaced to the user 102 in a GUI displayed on a display screen of one or more computing devices 104 associated with the user 102. In other examples, talking points are surfaced to the user 102 via audible output (e.g., spoken through a speaker integrated in or communicatively attached to a computing device 104 associated with the user 102). In some examples, talking points can be displayed on a screen of or played through a speaker of a companion device (e.g., a wearable device, a connected automobile, a mobile phone, another computer). Various examples of surfacing talking points to a user 102 are illustrated and described with reference to FIGS. 2A-D, 3, 4, and 5.

In some examples, the talking points system 128 further comprises a learning engine 124 illustrative of a software module, system, or device that is configured or operative to receive feedback associated with the user interactions with talking points provided to users 102 for learning which types of talking points are more relevant to the user 102 on a local level or to collective users 102 on a global level. For example, the learning engine 124 can analyze click-through rates or the user's or users' conversations 134 to determine which talking points presented to the users 102 are used. Accordingly, results determined by the learning engine 124 can be used to modify weights used by the ranker 120 for determining whether an information item of interest is relevant to a conversation 134 between the user 102 and a conversation participant 136.

Figures 2C, 2D:
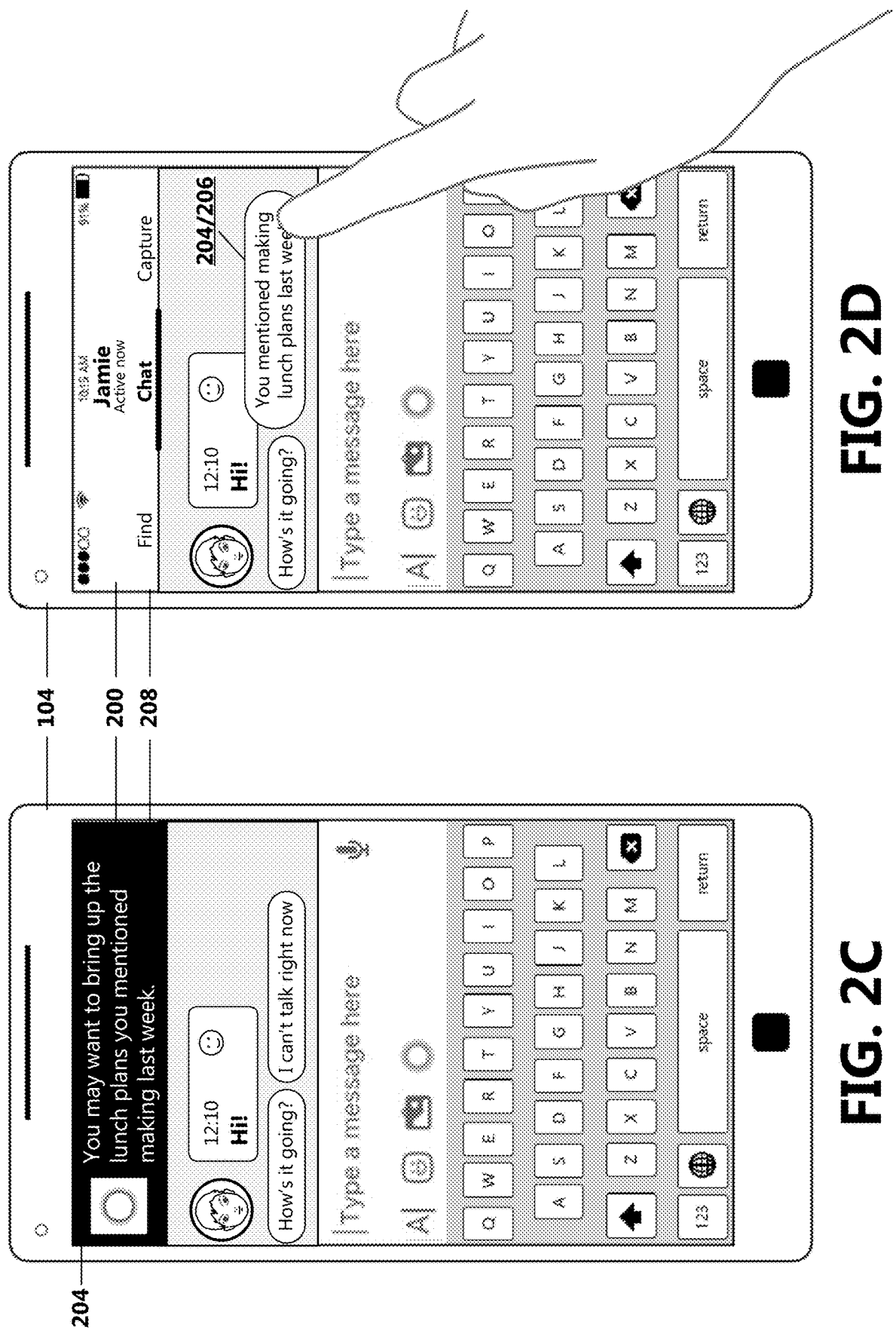
FIG. 2C is an illustration of an example user interface display showing another example of surfacing a talking point to the user.
FIG. 2D is an illustration of an example user interface display showing an example of surfacing a talking point to the user as a selectable suggestion.

With reference now to FIGS. 2A-D, an example user interface display 200 generated by aspects of a messaging or chat application 108 and displayed by a client computing device 104 embodied as a mobile phone is shown. In FIG. 2A, a user 102 receives a message 202 from an individual (in the illustrated example, Jamie), and the user 102 selects to respond to the message. Accordingly, a trigger associated with a conversation 134 between the user 102 and a conversation participant 136 (i.e., Jamie) is detected. In some examples, the trigger is associated with the receipt of the message 202 from the individual. In other examples, the trigger is associated with the selection by the user 102 to provide a response to the conversation participant 136. Responsive to detecting a trigger associated with a conversation 134 between the user 102 and the conversation participant 136, information items of interest are aggregated from one or more data sources 126 (e.g., by the aggregator 118) and ranked (e.g., by the ranker 120) for determining whether one or more pieces of the collected information items of interest are relevant to the conversation 134 between the user 102 and the conversation participant 136. For example, the aggregated information can include, without limitation, such information as past conversations 134 between the user 102 and the conversation participant 136, context information, user data, calendar information, organization or enterprise-related information, social media information associated with the user 102 and/or the conversation participant 136, publicly-available information, and the like.

With reference now to FIG. 2B, an example top-ranking talking point 204 is selected and presented to the user 102. In the example illustrated in FIG. 2B, the top-ranking talking point 204 is surfaced to the user 102 as an application-level notification displayed in a GUI on a display screen 208 of the client computing device 104. For example, one or more top-ranking talking points 204 can be provided via the application 108 being used to converse with the conversation participant 136 or via an application component instantiated in an application layer of the client computing device 104. In some examples, an application-level notification can be displayed as a visual notification, as illustrated, or in other examples, an application-level notification can be played audibly via a speaker. According to another example and as illustrated in FIG. 2C, one or more top-ranking talking points 204 can be surfaced to the user 102 as a system-level notification. For example, one or more top-ranking talking points 204 can be provided via the digital personal assistant 110 or another component supported in an operating system (OS) layer, and displayed on a screen 208 or played audibly via a speaker integrated in or communicatively attached to the client computing device 104.

In some examples and as illustrated in FIG. 2D, one or more top-ranking talking points 204 can be surfaced to the user 102 as one or more selectable suggestions 206. For example, one or more selectable suggestions 206, which can include one or more top-ranking talking points 204, can be provided (e.g., visually or audibly) to the user 102. Upon selection of a suggestion 206, the associated talking point 204 can be populated into a message from the user 102 or automatically sent as a response to the conversation participant 136.

Figure 3:
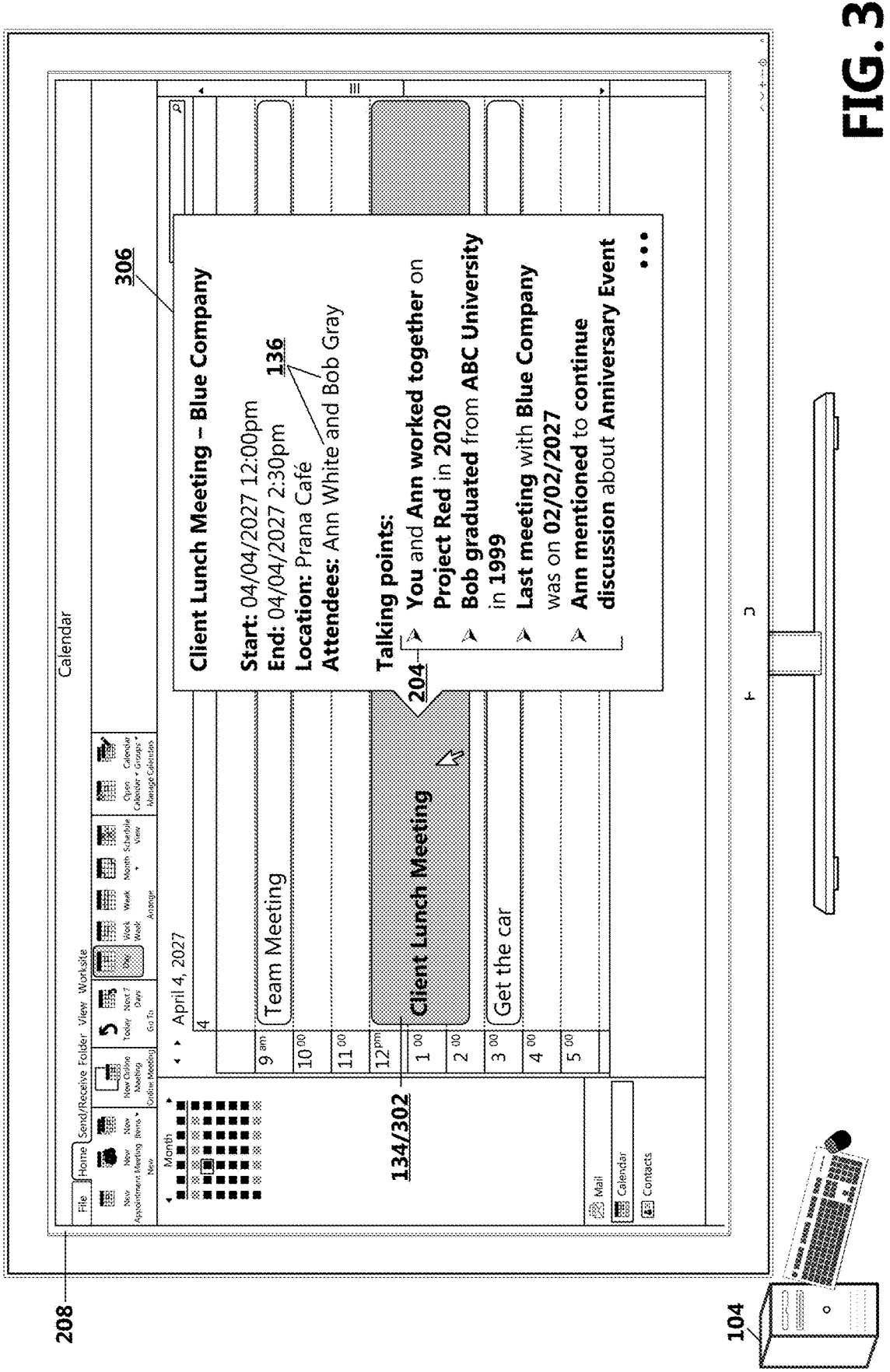
FIG. 3 is an illustration of an example user interface display showing an example of surfacing talking points to the user with meeting details.

According to an aspect, the talking points system 128 can generate and provide one or more talking points 204 for a current or an upcoming conversation 134, such as for a meeting 302 or appointment scheduled in the user's calendar. In some examples, talking points generated for a current or upcoming conversation 134 can be surfaced with details associated with the meeting 302 or appointment. For example and as illustrated in FIG. 3, the user 102 can select a meeting 302 in a calendar application 108 to view details 306 associated with the meeting 302, such as the start date and time, the end date and time, the location, attendees, etc. According to an aspect, one or more talking points 204 associated with the meeting 302 (i.e., upcoming conversation 134) or associated with a meeting with one or more meeting participants can be displayed with the meeting details 306. For example, the one or more talking points 204 can include information associated with projects the user 102 has worked on with a meeting participant, information from a social or professional profile associated with a meeting participant, information about a previous meeting or conversation 134 with a meeting participant, commitments or requests discussed in a previous meeting or conversation 134, etc.

Figure 4:
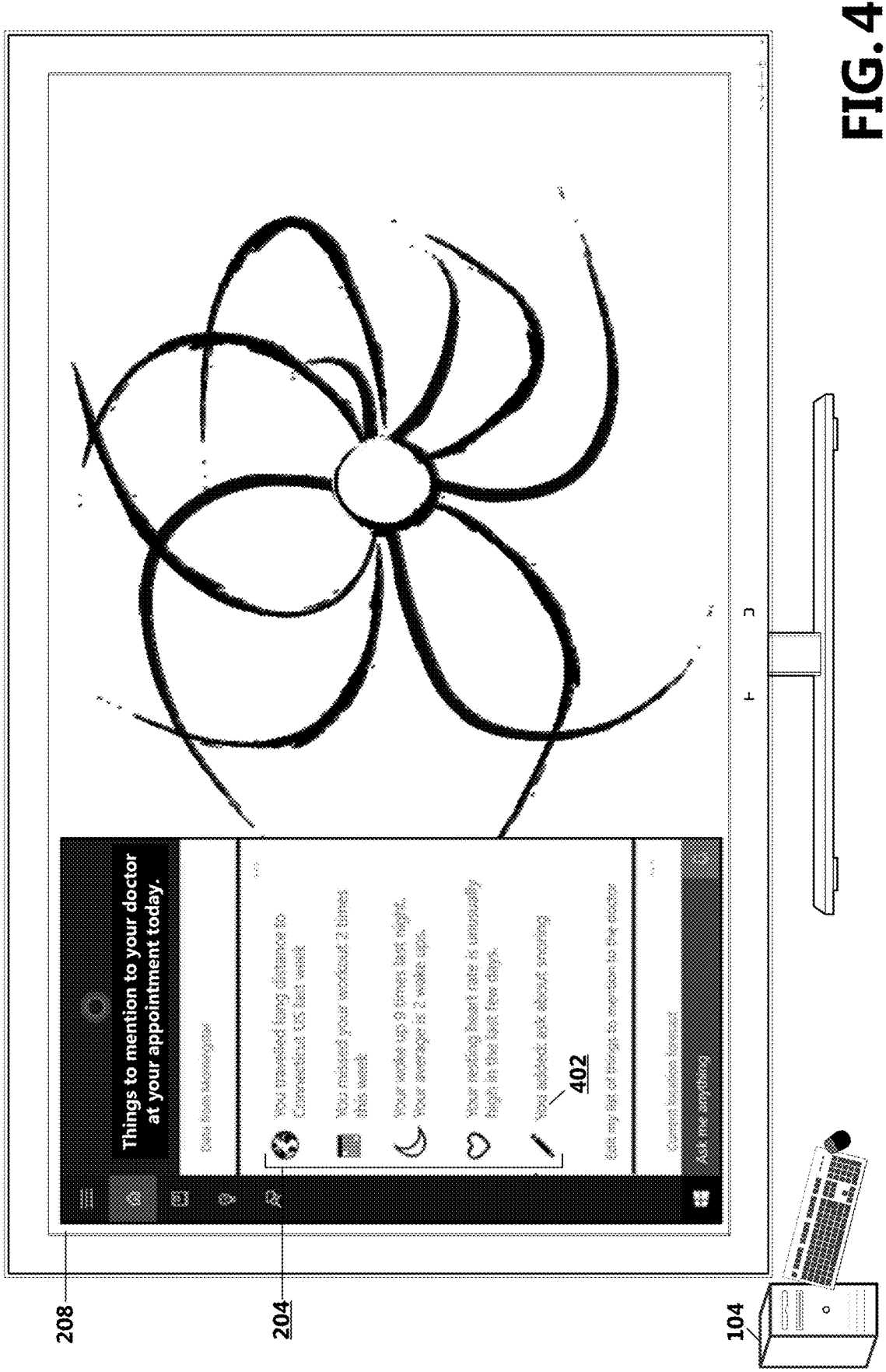
FIG. 4 is an illustration of an example user interface display showing an example of surfacing talking points to the user via a digital personal assistant.
Figure 5:
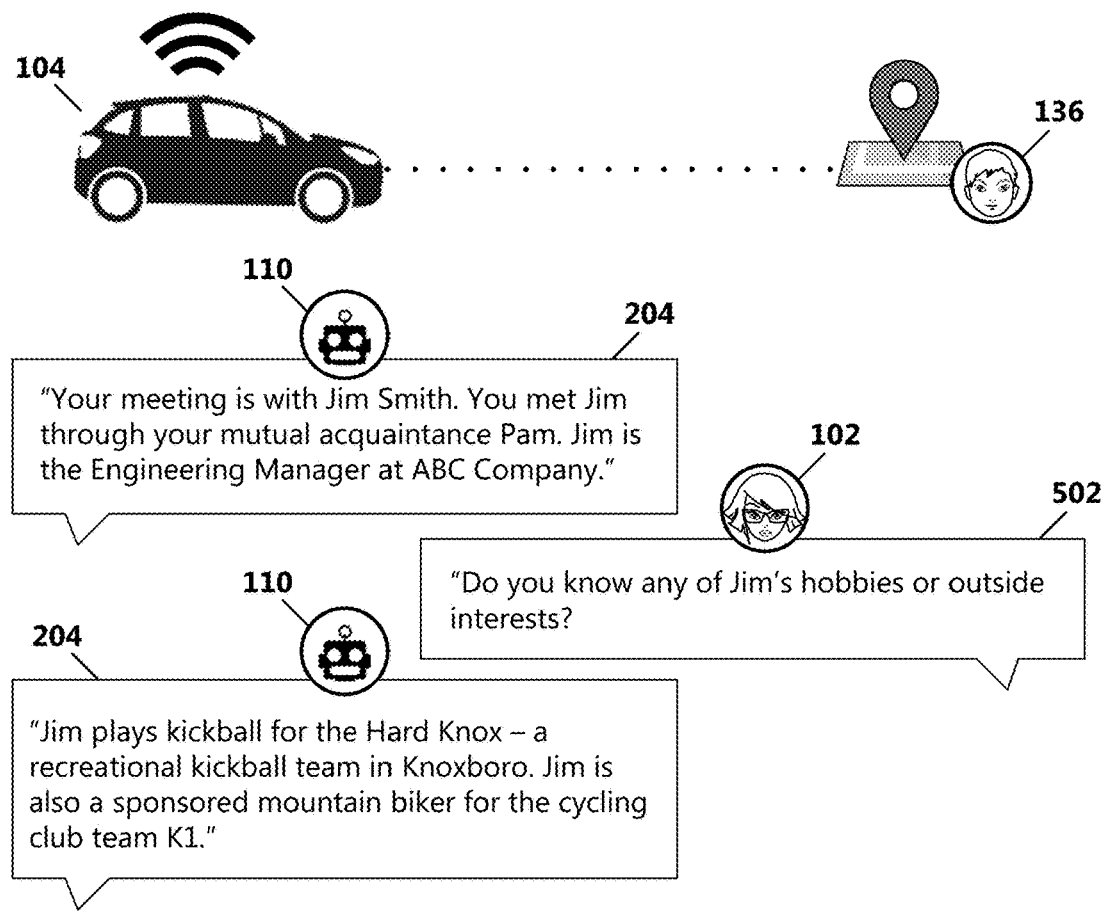
FIG. 5 is an illustration of an example of audibly surfacing talking points to the user as the user is travelling to a meeting.

In some examples and with reference now to FIG. 4, one or more talking points 204 can be surfaced with a predetermined or user-set lead time before a planned conversation 134 commences. As an example, the digital personal assistant 110 can show a proactive experience, such as the example shown in FIG. 4, where health-related talking points 204 are provided in a health-related context (e.g., for an upcoming doctor appointment). In the illustrated example, a plurality of automatically-generated talking points 204 and a manually-entered talking point 402 are surfaced to the user 102. For example, the plurality of automatically-generated talking points 204 can include top ranking physiologically-related information items of interest collected from one or more sensors, such as a wearable device. Although illustrated as being surfaced to the user 102 on a desktop client computing device 104, in other examples, one or more talking points 204 can be surfaced to the user 102 on another computing device, such as on the user's mobile phone or via a wearable device when a reminder of the appointment is provided.

In other examples, one or more talking points 204 can be surfaced to the user 102 when the user 102 is travelling to or has arrived at the appointment. For example and with reference now to FIG. 5, context information relating to the user's location detected by a client computing device 104, such as the user's mobile phone, a wearable device, or a connected automobile, combined with knowledge of a conversation 134 (e.g., a meeting) according to the user's calendar data can be detected by the talking points system 128 and determined to be trigger for providing talking points 204 relating to the conversation. As illustrated, on the user's commute to the detected meeting (i.e., conversation 134), one or more talking points 204 relating to the conversation 134 or the conversation participant(s) 136 are spoken or announced to the user 102. According to one example, the one or more talking points 204 can be provided via a digital personal assistant 110 and played through speakers of the user's automobile, or displayed on a screen in the automobile or another companion device.

In the illustrated example and according to an aspect, the user 102 is enabled to manually provide a talking point subject 502 to the talking points system 128 for surfacing items of interest relating to the talking point subject 502. For example, the user 102 can ask (e.g., via the digital personal assistant 110), "do you know any of Jim's (e.g., conversation participant 136) hobbies or outside interests?" Responsive to the user's input of a talking point subject 502, the talking points system 128 is configured or operative to either query one or more data sources 126 for information items of interest relating to the conversation participant's (i.e., Jim's) hobbies or outside interests, or re-rank previously collected information items of interest, wherein a higher weight is applied to information items of interest relating to the conversation participant's hobbies or outside interests. Accordingly and as illustrated, one or more top ranking information items of interest relating to the input talking point subject 502 are provided to the user 102.

Figure 6:
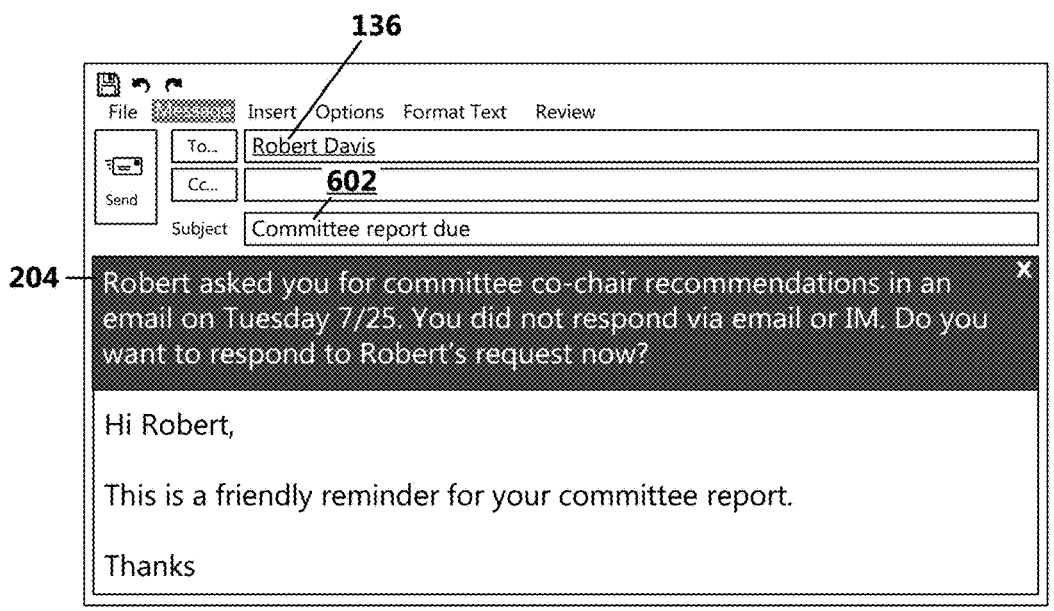
FIG. 6 is an illustration of an example user interface display showing an example of surfacing a talking point to the user as the user is composing an email.

With reference now to FIG. 6, in some examples, one or more talking points 204 can be surfaced to the user 102 upon detection of a current conversation 134, such as when the user 102 is composing an email to a particular conversation participant 136. For example, based on a collection and analysis of the user's past conversations 134, a request made by the particular conversation participant 136 for information from the user 102 is determined to be a highly-ranked information item of interest for the current conversation 134. Further, in some examples, the talking points system 128 is configured or operative to determine whether a commitment or request has been resolved (e.g., via an analysis of conversation data after a detected commitment or request). Accordingly, a talking point 602 related to an unresolved commitment or request can be surfaced to the user 102. As should be appreciated, the above examples are not intended to be limiting. Other examples are possible and are within the scope of the present disclosure.

Figure 7:
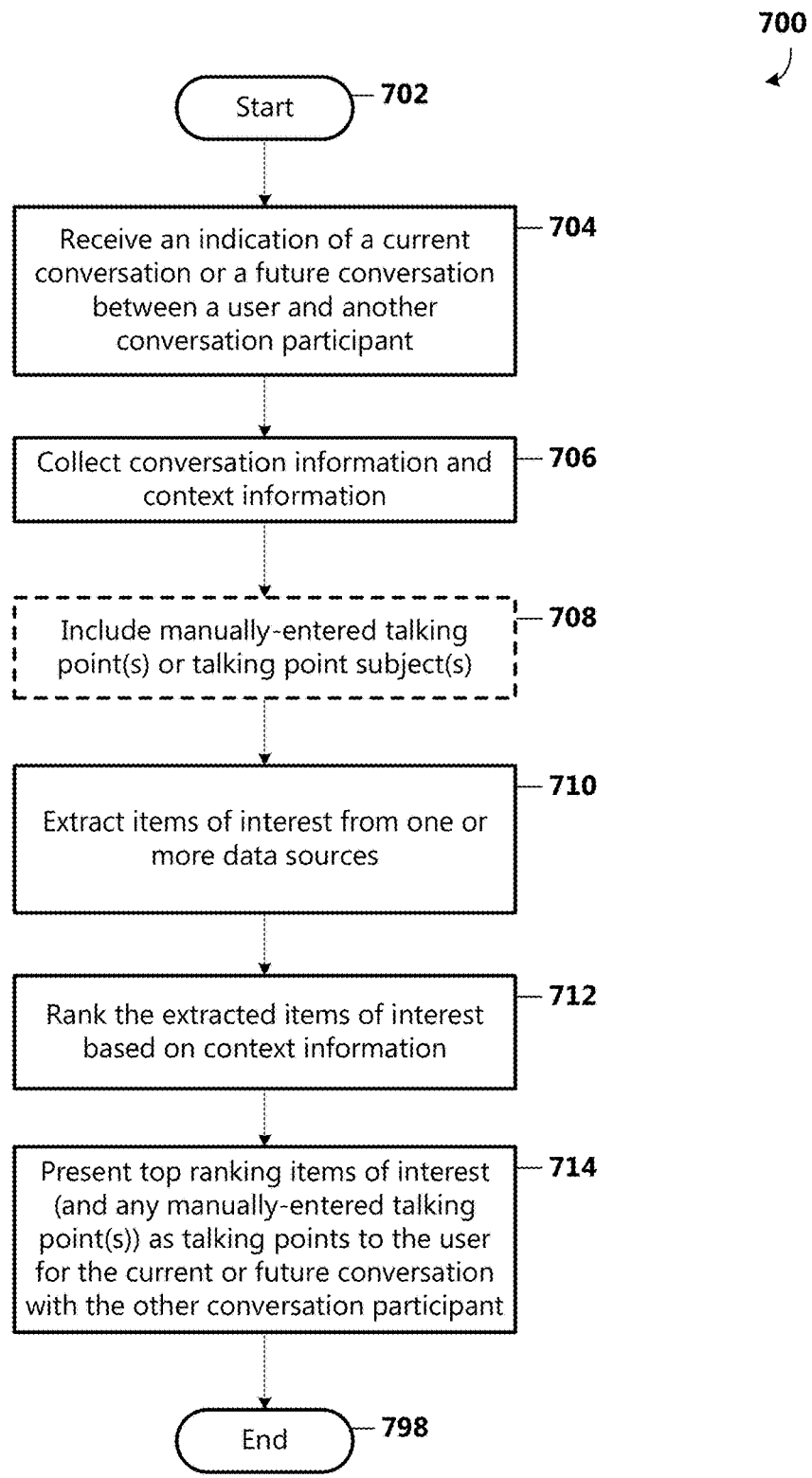
FIG. 7 is a flow chart showing general stages involved in an example method for generating and providing talking points for a personalized conversation.

Having described an operating environment and various examples with respect to FIGS. 1-6, FIG. 7 is a flow chart showing general stages involved in an example method 700 for generating and providing talking points to a user 102 for a personalized conversation 134. With reference now to FIG. 7, the method 700 begins at OPERATION 702, and proceeds to OPERATION 704, where an indication of a currently-occurring conversation 134 or of an upcoming conversation 134 between a user 102 and at least one other conversation participant 136 is detected. For example, the conversation event engine 116 receives an indication of a trigger associated with a conversation 134 between the user 102 and another conversation participant 136, such as: an initiation of a conversation (e.g., the start of a meeting 302 (which can include an ad hoc meeting); the start of an appointment; a selection to compose, respond to, or forward an email message; a selection to compose an instant message; receiving an electronic message; receiving a call from a conversation participant 136; dialing a phone number or selection of a contact for initiation of a phone call; and the like); a reminder of a meeting or appointment (e.g., m minutes in advance of the starting time of a meeting); a detection of a meeting 302 or appointment in the user's calendar within a next n hours or days; a detection of context information (e.g., the user's location, the user's activity, virtual co-presence of the user 102 and a conversation participant 136); based on knowledge of the user's schedule (e.g., detection of an event scheduled on the user's calendar); a request from the user for talking points 204; etc.

The method 700 proceeds to OPERATION 706, where information about the detected conversation 134 and context information are collected. For example, information about the detected conversation 134 can include collected and determined information associated with the conversation 134, such as a subject of the conversation, the participants of the conversation 134, whether the conversation 134 is a currently-occurring conversation 134 or is an upcoming conversation 134, information about the conversation medium (e.g., email, instant message or chat, online or in-person meeting 302, appointment, phone call), etc. Context information can be collected via one or more sensors and provided to the talking points system 128, such as information about the user's location, the user's activity, physiological data, applications 108 being used, a computing device type that the user 102 is using, etc.

At OPTIONAL OPERATION 708, manually-entered talking point related information (e.g., one or more manually-entered talking points 402, one or more talking point subjects) input by the user 102 is called up by the talking points system 128. For example, the user 102 is enabled to manually enter talking points, where the user's intent is for the one or more manually-entered talking points 402 to be surfaced for a particular conversation 134 or for a conversation 134 with a particular conversation participant 136. In another example, the user 102 is enabled to manually enter a talking point subject, where the user's intent is to surface one or more talking points 204 related to the talking point subject.

The method 700 continues to OPERATION 710, where data from one or more data sources 126 are aggregated for information items of interest related to the detected conversation 134, which can include information items of interest related to conversation participants 136, and any manually-entered talking point subjects. For example, data are aggregated from one or more web sources, social networks, one or more sources of user data, or from the user's enterprise. In some examples, one or more data sources 126 can include sources including information about the user's behaviors (in which such behaviors are monitored/tracked with notice to the user 102 and with the user's consent), a record or history of the user's communications with contacts, mutual interests, past conversation topics, past promises or requests, past or current projects, updates (e.g., job changes, organizational changes, new projects), etc. In some examples, some data, such as the user's conversation history, are aggregated and indexed prior to the detection of the conversation 134. In some examples, some data, such as web, social, or enterprise information related to a conversation participant 136 are searched for and collected upon detection of the conversation 134.

The method 700 continues to OPERATION 712, where collected items of interest are ranked based on a determined level of relevance to the particular conversation 134 and/or to a particular conversation participant 136, and at OPERATION 714, one or more top-ranking information items of interest (and any manually-entered information items of interest) are surfaced to the user 102 as one or more suggested talking points 204 for the user 102 in the conversation 134. For example, the one or more talking points 204 can be surfaced on a visual display or audibly through a speaker of the client computing device 104 or of a companion device, and can be provided before the conversation 134 or during the conversation 134. In some examples, user interaction information is collected. For example, the user interaction information can relate to whether the user 102 used a suggested talking point 204 in the conversation 134. Collected user interaction information can be used to calibrate the ranker 120 for providing more relevant talking points 204 to the user 102. The method 700 ends at OPERATION 798.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
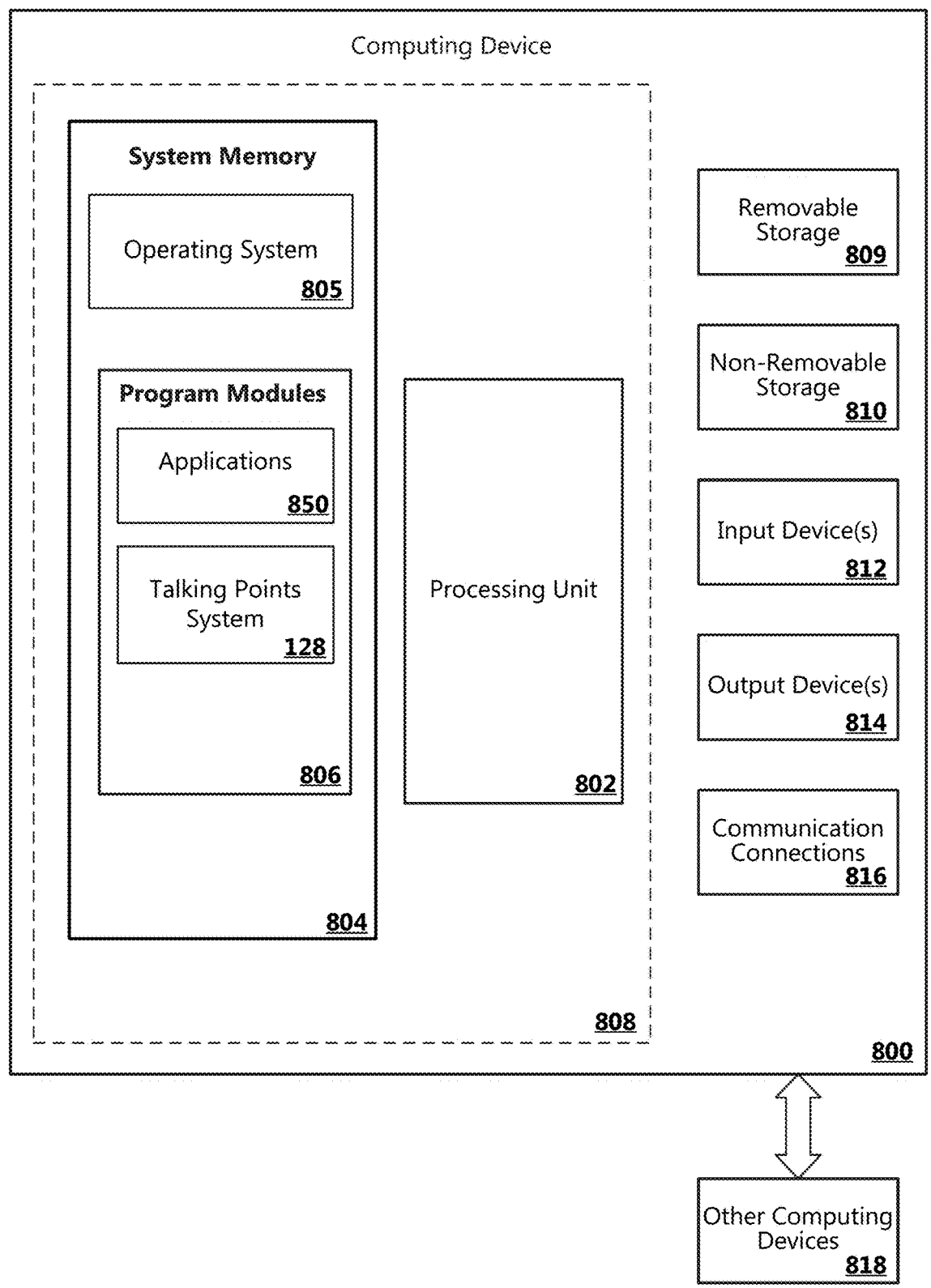
FIG. 8 is a block diagram illustrating example physical components of a computing device.
Figure 9A:
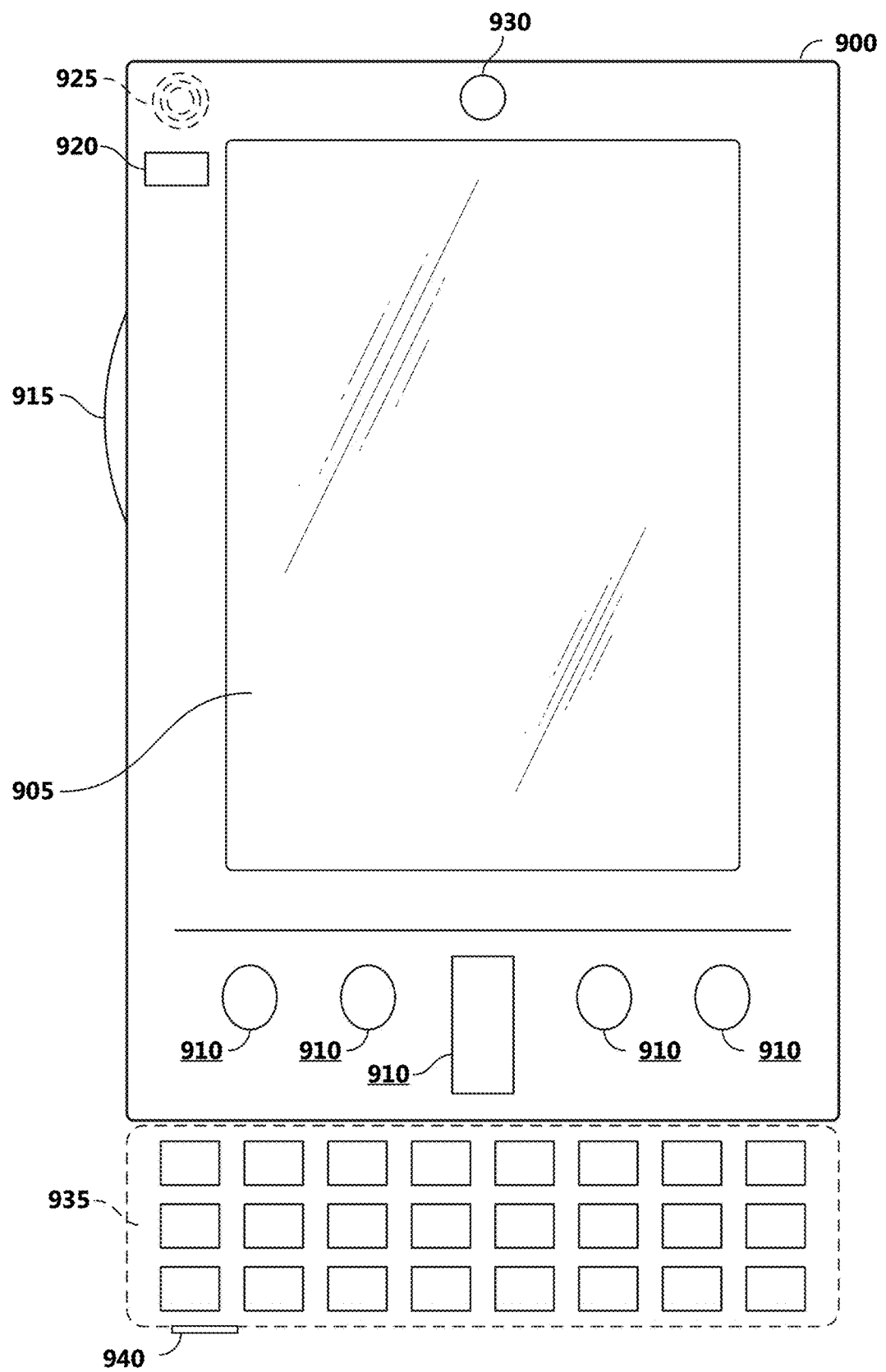
FIGS. 9A and 9B are block diagrams of a mobile computing device.
Figure 9B:
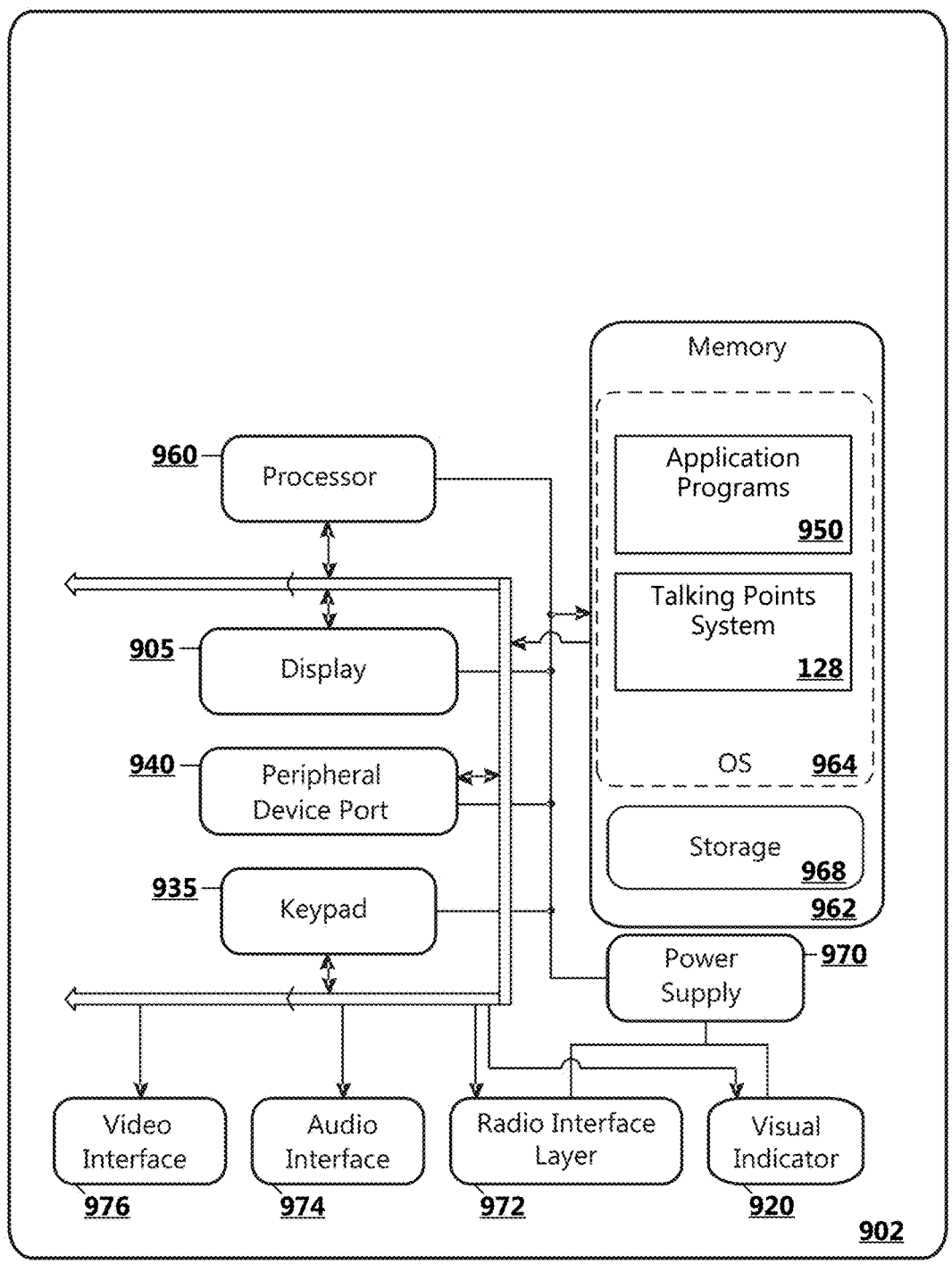
Figure 10:
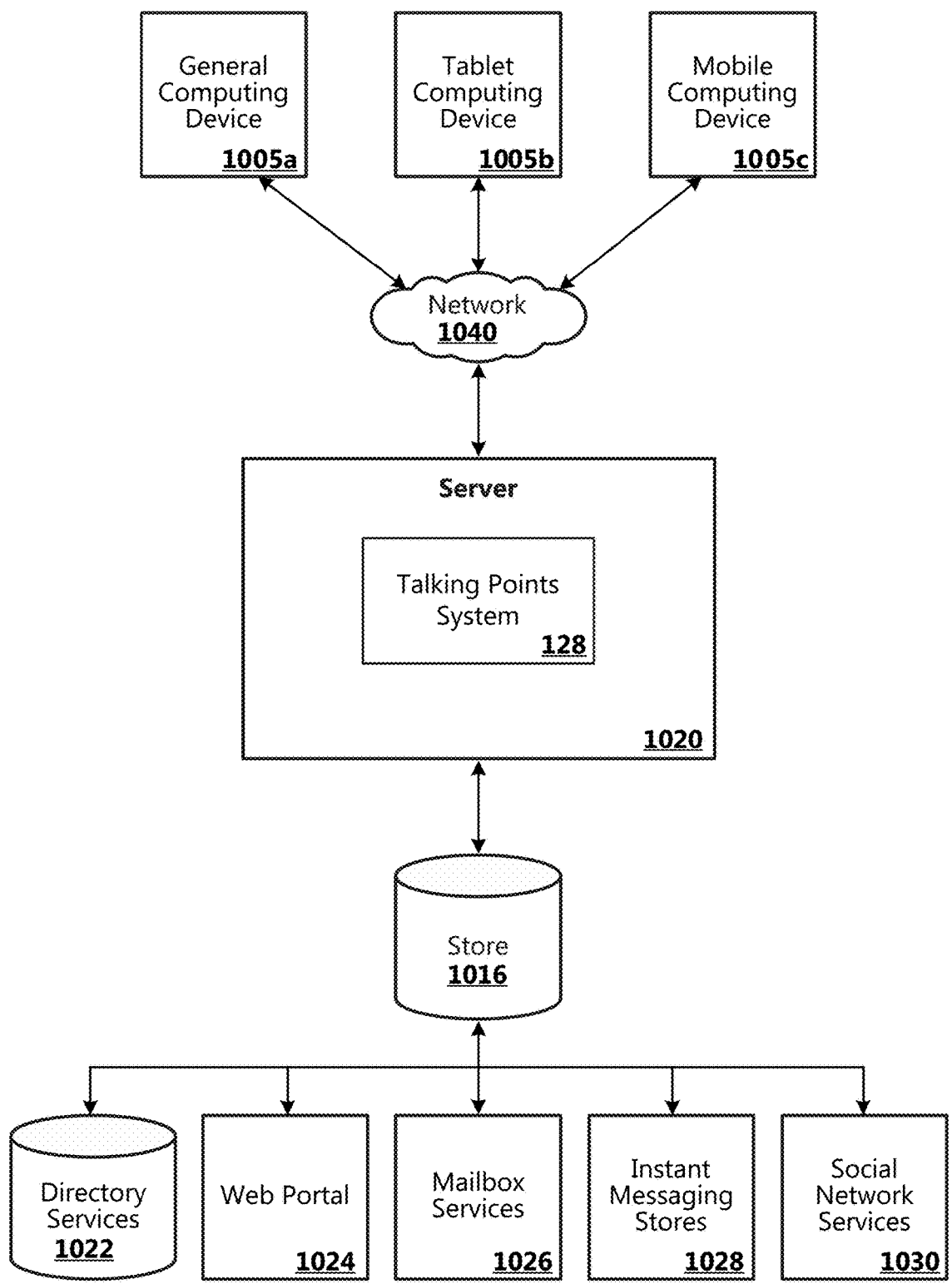
FIG. 10 is a block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are used for practicing aspects, described herein.

FIG. 8 is a block diagram illustrating physical components (i.e., hardware) of a computing device 800 with which examples of the present disclosure may be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the talking points system 128. The operating system 805, for example, is suitable for controlling the operation of the computing device 800. Furthermore, aspects are practiced in conjunction with a graphics library, other operating systems, or any other application program, and is not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., talking points system 128) perform processes including, but not limited to, one or more of the stages of the method 700 illustrated in FIG. 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the talking points system 128 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system for generating and providing talking points for a personalized conversation as described above. Content developed, interacted with, or edited in association with the talking points system 128 is enabled to be stored in different communication channels or other storage types. For example, various documents may be stored using a directory service 1022, a web portal 1024, a mailbox service 1026, an instant messaging store 1028, or a social networking site 1030. The talking points system 128 is configured or operative to use any of these types of systems or the like for generating and providing talking points for a personalized conversation, as described herein. According to an aspect, a server 1020 provides the talking points system 128 to clients 1005a,b,c. As one example, the server 1020 is a web server providing the talking points system 128 over the web. The server 1020 provides the talking points system 128 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for providing one or more talking points, the system comprising:
at least one processing device; and
at least one computer readable data storage device storing instructions that, when executed by the at least one processing device, cause the system to:
detect an upcoming conversation between a user and another conversation participant based on calendar data retrieved from a calendaring application executing on a computing device of the user, the calendar data including a scheduled event associated with the upcoming conversation; and
prior to the upcoming conversation:
extract, from data collected from one or more data sources, information items of interest associated with the upcoming conversation and the other conversation participant;
receive a manually-entered talking point;
rank the extracted information items of interest based on a level of relevance to the upcoming conversation; and
provide a notification for display that includes one or more top ranking information items of interest for the upcoming conversation as automatically-generated talking points in combination with the manually-entered talking point.

2. The system of claim 1, wherein the system is further operative to detect a trigger associated with the upcoming conversation and provide the notification for display that includes the one or more talking points in response to detecting the trigger, the trigger comprising at least one of:
an initiation of the upcoming conversation;
a reminder of the upcoming conversation, wherein the upcoming conversation is a meeting or an appointment;
location of the user at or travelling to a location associated with the upcoming conversation;
virtual co-presence of the user and the other conversation participant; and a request for the one or more talking points from the user.

3. The system of claim 2, wherein the initiation of the upcoming conversation includes one or more of:
a start of a meeting;
a start of an appointment;
a selection to compose, respond to, or forward an email message;
a receipt of an email message;
a selection to compose an instant message;
a receipt of a call from the other conversation participant; and
dialing a phone number or receiving a selection of a contact for initiation of a phone call.

4. The system of claim 1, wherein the system is further operative to collect context information and determine information about the upcoming conversation, wherein the context information includes at least one of:
a subject of the upcoming conversation;
participants of the upcoming conversation; and
a conversation medium.

5. The system of claim 4, wherein the conversation medium is one of:
an email;
an instant message or chat;
an online meeting;
an in-person meeting; or
a phone call.

6. The system of claim 4, the system further configured to:
determine a level of relevance of each of the extracted information items of interest to the upcoming conversation, wherein in determining the level of relevance of each of the extracted information items of interest to the upcoming conversation, the system is operative to determine the level of relevance based at least in part on the context information; and provide the notification for display that includes one or more of the extracted information items of interest based on the determined level of relevance as the one or more talking points to the user for the upcoming conversation with the other conversation participant, wherein the notification is displayed by one or more of the calendaring application and an application being used for the upcoming conversation that is executing on the computing device of the user.

7. The system of claim 1, wherein in extracting the information items of interest associated with the upcoming conversation or the other conversation participant, the system is operative to extract one or more of:
  commitments or requests from historic conversation data;
  anomalous activity from historic data;
  a detected user pattern that demonstrates a trend;
  business-related insights or facts; and
  personal insights or facts.

8. The system of claim 1, wherein the one or more data sources include at least one of:
  a web source;
  a social network;
  user data source;
  enterprise data;
  sensor data;
  historical conversation data; and
  historical search data.

9. The system of claim 1, wherein the system is further operative to: receive a category from the user, wherein the category is associated with the one or more talking points.

10. The system of claim 1, wherein the system is further operative to:
  extract information items of interest related to a subject of the manually-entered talking point; and
  provide in the notification for display of the extracted information items of interest related to a subject of the manually-entered talking point as the one or more talking points to the user in combination with the automatically-generated talking points and the manually-entered talking point.

11. The system of claim 1, wherein the system is further operative to, responsive to receiving a user-edit to or a user-deletion of a talking point, update a display of the one or more talking points based on the user-edit or the user-deletion.

12. The system of claim 1, wherein in providing the notification for display that includes the one or more talking points, the system is operative to include the one or more talking points in at least one of:
  a visual notification displayed on a screen; or
  an audible notification played via a speaker.

13. A computer-implemented method for providing one or more talking points, comprising:
  detecting an upcoming conversation between a user and another conversation participant based on calendar data retrieved from a calendaring application executing on a computing device of the user, the calendar data including a scheduled event associated with the upcoming conversation; and
  prior to the upcoming conversation:
  extracting, from data collected from one or more data sources, information items of interest associated with the upcoming conversation and the other conversation participant;
  receiving a manually-entered talking point;
  ranking the extracted information items of interest based on a level of relevance to the upcoming conversation; and
  providing a notification for display that includes one or more top ranking information items of interest for the upcoming conversation as automatically-generated talking points in combination with the manually-entered talking point.

14. The method of claim 13, further comprising collecting context information associated with the upcoming conversation, wherein the context information includes at least one of:
  a subject of the upcoming conversation;
  participants of the upcoming conversation; and
  a conversation medium.

15. The method of claim 14, the method further comprising:
  determining a level of relevance of each of the extracted information items of interest to the upcoming conversation, wherein determining the level of relevance of each of the extracted information items of interest comprises determining the level of relevance based at least in part on the context information; and
  providing the notification for display that includes one or more of the extracted information items of interest based on the determined level of relevance as the one or more talking points to the user for the upcoming conversation with the other conversation participant, wherein the notification is displayed by one or more of the calendaring application and an application being used for the upcoming conversation that is executing on the computing device of the user.

16. The method of claim 13, further comprising detecting a trigger associated with the upcoming conversation and providing the notification for display that includes the one or more talking points in response to detecting the trigger, wherein the trigger comprises at least one of:
  an initiation of the upcoming conversation;
  a reminder of the upcoming conversation, wherein the upcoming conversation is a meeting or an appointment;
  location of the user at or travelling to a location associated with the upcoming conversation;
  virtual co-presence of the user and the other conversation participant; and
  a request from the user for one or more talking points.

17. The method of claim 13, wherein extracting the information items of interest associated with the upcoming conversation and the other conversation participant comprises at least one of:
  extracting commitments or requests from historic conversation data;
  extracting anomalous activity from historic data;
  extracting a detected pattern demonstrating a trend; and
  extracting business-related or personal insights or facts.

18. The method of claim 13, wherein extracting the information items of interest associated with the upcoming conversation and the other conversation participant from data collected from the one or more data sources comprises extracting the information items of interest from data collected from one or more of:
  a web source;
  a social network;
  user data source;
  enterprise data;
  sensor data;
  historical conversation data; and
  historical search data.

19. The method of claim 13, further comprising:
- extracting information items of interest related to a subject of the manually-entered talking point; and
- providing in the notification for display of the extracted information items of interest related to a subject of the manually-entered talking point as the one or more talking points to the user in combination with the automatically-generated talking points and the manually-entered talking point.

20. A computer readable storage device including computer readable instructions, which when executed by a processing unit is operative to:
- detect an upcoming conversation between a user and another conversation participant based on calendar data retrieved from a calendaring application executing on a computing device of the user, the calendar data including a scheduled event associated with the upcoming conversation; and
- prior to the upcoming conversation:
- extracting, from data collected from one or more data sources, information items of interest associated with the upcoming conversation and the other conversation participant;
- receiving a manually-entered talking point;
- ranking the extracted information items of interest based on a level of relevance to the upcoming conversation; and
- presenting one or more top ranking information items of interest for the upcoming conversation as automatically-generated talking points in combination with the manually-entered talking point.

* * * * *